United States Patent [19]
McKinley et al.

[11] 3,893,490
[45] July 8, 1975

[54] WINDING AND INSERTING APPARATUS AND METHOD

[75] Inventors: Hollace R. McKinley; Leo M. Schlaudroff, both of Fort Wayne, Ind.

[73] Assignee: General Electric Company, Fort Wayne, Ind.

[22] Filed: Apr. 8, 1974

[21] Appl. No.: 458,460

Related U.S. Application Data

[62] Division of Ser. No. 306,527, Nov. 15, 1972, abandoned.

[52] U.S. Cl............................ 140/92.1; 29/596
[51] Int. Cl.................................... B21f 3/04
[58] Field of Search............. 140/1, 92.1; 29/205 R, 29/205 D, 596

[56] References Cited
UNITED STATES PATENTS

| | | | |
|---|---|---|---|
| 2,934,099 | 4/1960 | Mason | 140/92.1 |
| 3,151,638 | 10/1964 | Hill | 140/1 |
| 3,189,059 | 6/1965 | Moore | 140/92.1 |

*Primary Examiner*—Lowell A. Larson
*Attorney, Agent, or Firm*—John M. Stoudt

[57] ABSTRACT

Method and apparatus for winding and inserting stator coils is disclosed, comprising a collapsible coil form about which electrically conductive wire may be wound to thereby create a coil group; whereupon the coil form may be collapsed to relieve the tension on individual turns to allow movement of the coil group into the slots of a stator core. A portion of the coil form supports the coil group and is guided into the bore of a stator by a guide plug which was previously passed therethrough, and which is provided with a plurality of circumferentially disposed axially extending keys dimensioned to fit closely between two adjacent stator teeth to assure proper orientation of the stator relative to the guide plug. The movable part of the coil form may be provided with one or more similar keys to assure proper relative orientation of the coil form and the stator after the form has entered the stator bore, and with means for alignably engaging the guide means prior to entering the bore.

8 Claims, 4 Drawing Figures

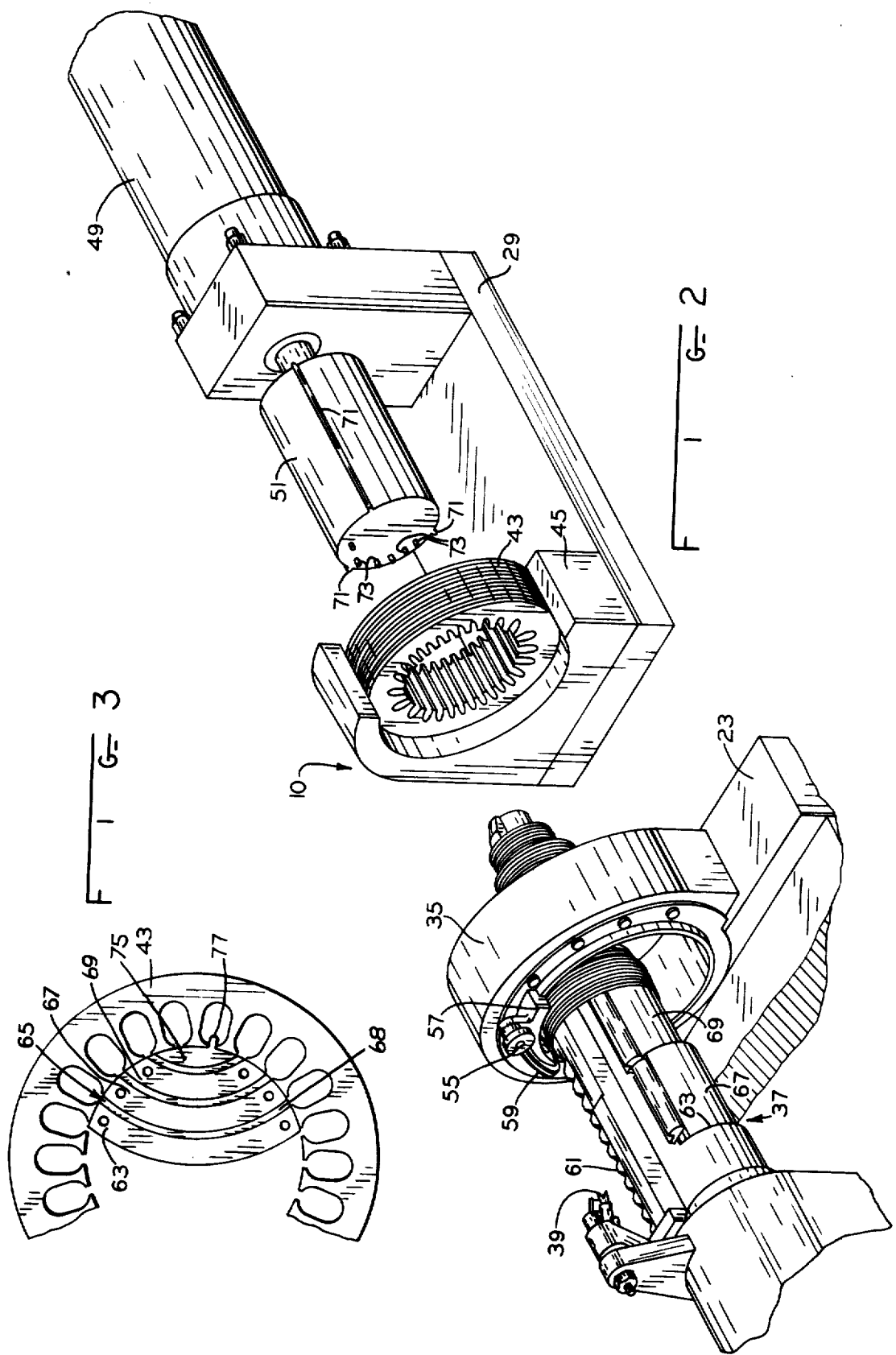

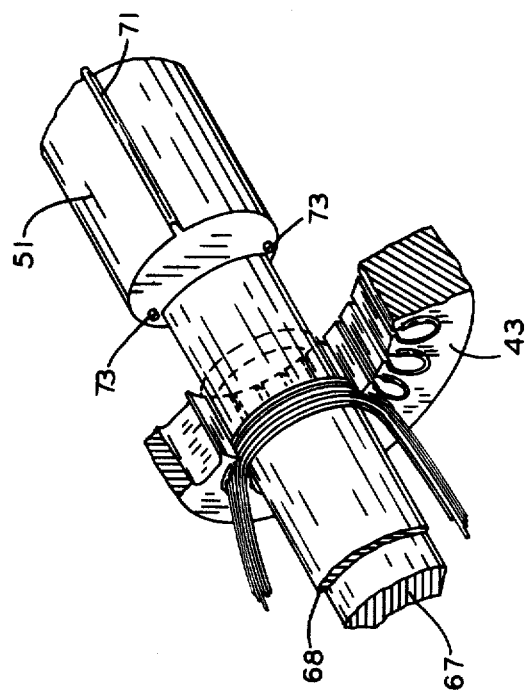

WINDING AND INSERTING APPARATUS AND METHOD

CROSS REFERENCE TO RELATED APPLICATION

This application is a Division of our application Ser. No. 306,527 which was filed Nov. 15, 1972, now abandoned.

BACKGROUND OF THE INVENTION

The present invention relates generally to improved apparatus and methods for developing windings in electro-magnetic devices, and more particularly to apparatus and method for winding coils and then inserting the wound coils into a stator core. More specifically, the present invention relates to a system for aligning a coil inserting device and a stator core.

Stator coil winding and inserting equipment of different types is known in the art. One type is illustrated for example, by U.S. Pat. No. 2,934,099 to Mason, the entire disclosure of which is specifically incorporated herein by reference. The Mason patent discloses (among other things) a coil winding and inserting machine which includes a coil form and a rotatable flier that is supported on a movable carriage. The carriage moves along the coil form while the flier rotates about the form so as to wind coil turns thereon. The coil form includes spaced apart members, selected ones of which are adapted to participate in the coil forming process. These spaced apart members are movable axially relative to a stator during insertion of coils into that stator.

Coil winding and inserting machines, of the type known heretofore, function well under many circumstances; however, some motor designs require that members used during a coil insertion process extend in cantilever fashion a substantial distance from the point at which such members are supported; and when these members or tools are extended to insert the coils in the stator, substantial alignment problems may be encountered.

Accordingly, it is one object of the present invention to improve the alignment between a stator core and coil inserting means during a coil insertion process.

It is another object of the present invention to provide means for aligning a coil inserting device with a stator core.

It is a general object of the present invention to provide an improved coil winding and inserting system.

Still another object of the present invention is to provide a method of inserting coils in a stator core.

The free end of the coil inserting device may experience bending due to gravitational effects as well as movement due, for example, to machine vibration and thus the precise location of that free end is not invariant. If as is desirable, the coil inserting device is dimensioned to mate with the stator core to very close tolerances, the coil inserting device may on occasion strike the stator core as it is moved toward that core to insert the coils thus resulting in damage to the stator and more importantly to the equipment. To avoid the possibility of impact between the coil inserting device and the stator core, the inserting device may be made somewhat smaller so as to fit within the stator bore in a loose fashion; however under these circumstances, the coils of wire which are supported by the coil inserting device and deposited in the stator slot as that inserting device passes through the stator bore may be damaged due to imperfect alignment of those coils with the stator slots. Thus should the coil strike one of the stator teeth rather than passing between two adjacent stator teeth, insulation on the winding conductor would in all probability, be damaged resulting in a rejected stator.

It is accordingly a further object of the present invention to diminish the likelihood of damage to product or machinery in a coil winding and inserting process.

Yet another object of the present invention is to provide a coil winding and inserting device of improved reliability.

SUMMARY OF THE INVENTION

In accordance with our invention we provide methods and apparatus which, in a preferred form, include coil winding and inserting means as well as guide means which may be inserted in a stator bore and aligned therewith to very close tolerances. The guide means guides the coil inserting means into the stator bore. In an illustrated embodiment, the guide means is in the form of a guide cylinder having a diameter just slightly less than the stator bore diameter, and includes a plurality of alignment keys axially disposed thereon which keys fit closely between adjacent stator teeth to thereby assure the proper alignment and orientation of the stator core relative to the guide member. The illustrated guide means also includes a series of pins extending axially from one end thereof which engage a corresponding set of holes in a coil inserting tool assembly with the coil inserting assembly being positioned to engage the pins while the guide cylinder is located within the stator and then to force the guide cylinder through the stator bore with the coil inserting device following the guide cylinder through the bore. The coil inserting tool assembly may have similar keys which fit closely between adjacent teeth of the stator to maintain the orientation of the stator once the coil inserting tool assembly has forced the guide cylinder out the opposite end of the stator bore.

BRIEF DESCRIPTION OF THE DRAWING

The aforementioned and other objects, features, and advantages of the present invention will become more apparent in the following detailed description thereof when considered in conjunction with the drawings wherein:

FIG. 2 is a perspective view of a portion of the machine of FIG. 1 better illustrating the coil form, flier, stator, and guide member;

FIG. 3 is a view along the line 3—3 of FIG. 2 but illustrating the end of the tooling after it has passed into the stator bore; and FIG. 4 is a perspective view illustrating the spatial relationship of the tooling, stator and guide during coil insertion.

DESCRIPTION OF THE PREFERRED EMBODIMENT

Figure 1:
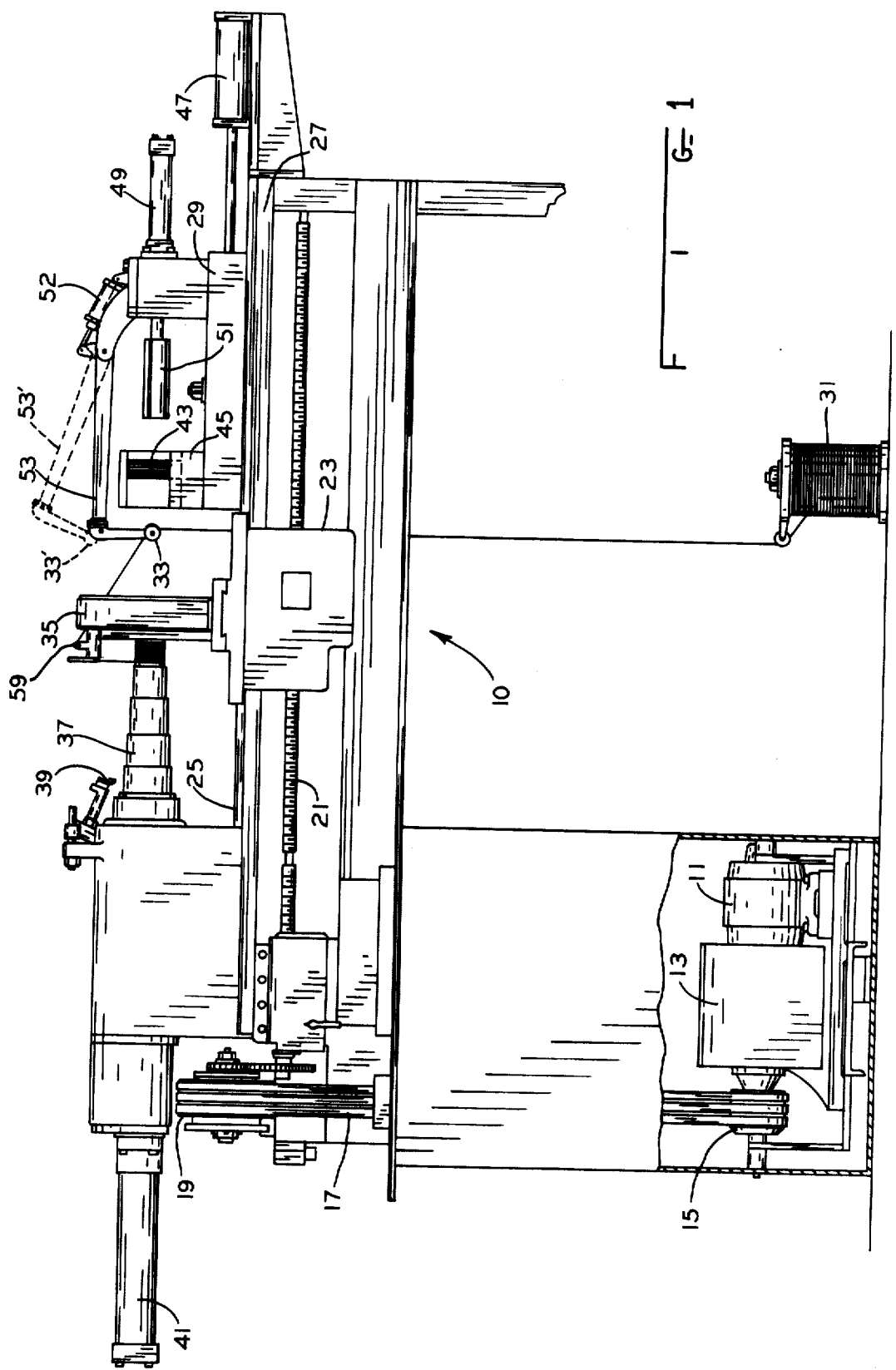
FIG. 1 is a view in side elevation partly broken away of a machine embodying the present invention.

In FIG. 1 we have illustrated a coil winding and inserting machine embodying the invention in one form. The primary energy sources for the winding and inserting machine 10 is an electric motor 11 which drives a clutch and brake mechanism 13 and optionally also a pump for hydraulic and/or air pressure for the fluidically actuated cylinders to be discussed later. A series of driving pulleys 15 transmit the rotary motion by way of belts 17 to another set of pulleys 19; and by appropriate gearing and/or pulley connection, a lead (or feed) screw 21 may be rotated to move a carriage 23 to the left or right as it is supported by ways 25 of a bed 27. This bed also supports a second carriage 29 which functions as a stator carriage.

During a winding operation electrically conductive wire from a source 31 is fed by way of retractable pulley 33 to a winding generating structure 35 which will be discussed in greater detail in conjunction with FIG. 2. The winding generating structure 35 wraps wire about a coil form 37 and, at the end of the winding operation, a wire cutter 39 severs the last wound coil turn from the source of wire and hydraulic cylinder 41 is actuated to move a portion of the coil form 37 toward the right as viewed in FIG. 1 so as to pass through the bore of a stator 43 held in a stator holder 45. The stator holder 45, supported on a carriage 29, may be moved to the left or right on the ways 25 by actuating the pneumatic cylinder 47. The carriage 29 also supports an air cylinder 49 which when actuated functions to move the guide member 51 to the left into the stator 43. Yet another fluidic cylinder 52 is supported on the carriage 29 and serves to move an arm 53 between the winding position as illustrated in solid lines and an out of the way position illustrated in dotted lines to allow the tooling 37 to move toward the right and into the stator 43. The details of the winding generating structure 35 and the overall operation of the machine 10 are illustrated in more detail in FIG. 2.

In FIG. 2 the winding generating structure 35 has a wire dispensing pulley 55 which rotates about the coil form laying wire thereon and which is supported by the flier 57 which in turn rotates in the winding generating structure housing on a ring gear which is driven by a shaft (not shown) from the pulley system 19 of FIG. 1. A second direction reversing pulley 59 of course, accepts wire from the pulley 33 of FIG. 1.

The coil form or tooling 37 includes a collapsible portion 61 which may optionally be provided with notches as illustrated to separate successive loops or turns of wire but in either event is movable toward turn confining portions of the tooling all as is more fully described in the aforementioned Mason patent. Portion 61 is collapsed to relieve the tension on individual turns and thereby allow movement of the coils into the stator core 43 during the insertion step.

While the flier 57 is revolving about the coil form 37, the lead screw 21 is moving the carriage 23 from right to left as viewed in FIGS. 1 and 2, and thus the flier 57 lays down successive turns on the coil form from one end to the other. when the carriage 23 reaches its leftmost extent of travel, the flier 57 is stopped and wire cutter 39 severs the wire. The coil form portion 61 is then collapsed and the outermost cylindrical segment 63 is moved toward the right over top of the wire which has been layed on the cylindrical segment 67 to thereby hold that particular coil between these two cylindrical segments.

Turning briefly to FIG. 3 the cylindrical segments 63 and 67 are seen to be separated by a gap 65 which contains a pusher plate 68 as described in the aforementioned Mason patent and which will be actuable at a later time to force the coils out along the gap and into slots in the core. The engagement of the guide means 51 and a portion of the tooling is illustrated in relation to the stator 43 and the pusher plate 68 in the partial perspective view of FIG. 4. In this view the segment 63 has been omitted to illustrate the action of pusher plate 68 inserting the coil into a pair of slots in the stator. The pins 73 would not in actual practice be visible in this view since they would be engaged with corresponding holes in the end of segment 63.

The telescoping cylindrical segments of the tooling are telescoped together after moving toward the right and into the bore of the stator while the pusher plates will have forced the winding turns into the slots of the core. By this time, the air cylinder 52 also will have been actuated to move arm 53 and pulley 33 out of the way for example to the position illustrated in dotted lines at 33' and 53'.

Just prior to advancing the tooling toward the stator core, air cylinder 49 will have been actuated to move the guide member 51 leftward toward the stator core 43 which guide member 51 is cylindrically dimensioned to just pass through the stator bore with the keys 71 being dimensioned to fit closely between adjacent slot opening defining stator teeth. When the guide member passes through the stator bore, it accurately aligns and orients the stator 43 relative to this guide member. The several dividers 63, 67, and 69 are, as illustrated in FIG. 3, provided with holes spaced so as to engage corresponding pins 73 on the guide member as those several divider plates continue their rightward movement which engagement is illustrated in FIG. 4 and, when the dividers are engaged with the pins 73 on the guide member 51, the air cylinder 49 yields sufficiently to allow a continued rightward movement of dividers and guide member.

Before the dividers enter the stator bore, proper relative alignment of the insertion tooling and the stator is maintained by the guide member 51. When the dividers have forced guide member 51 completely out of the stator bore, the coils of wire disposed in the appropriate stator slots may maintain proper alignment of the stator core relative to the tooling or the innermost divider plate 75 may be provided with a key 77 similar to the keys 71 for assisting in maintaining proper alignment between the tooling and the stator core.

When the several divider plates have reached their rightmost extension, the pusher plates such as the one at 65 have been actuated to force the several coils from their nested encasement between divider plates to thus complete the process of depositing the coils in the stator slots, both divider plates and pusher plates are retracted to the position illustrated in FIG. 2 for a new winding operation. At this point in the operation, the operator may remove the stator core 43 and revolve it, for example, 180° for a two-pole machine, replacing it in the stator holder 45 or other means may be provided for indexing the equipment preparatory to inserting another coil group into the stator slots.

In summary, the overall machine 10 has a general axis of elongation. The guide member or plug 51 is cylindrical in shape with a central axis of that cylinder lying approximately on the general axis of elongation. This plug 51 is reciprocable along its central axis by the air cylinder 49 moving it through stator bore and subsequently by the tooling pushing it back out of that stator bore. The stator is aligned to the guide means 51 and the tooling is also aligned to this guide means 51 so that the tooling may be led into the stator by the guide.

Wire is dispensed onto the coil form with one or more turns of wire on a given one of the divider plates forming a coil in a coil group. The side turn portions of each coil are to be placed in a specific pair of stator slots. The coils in turn establish the windings of all or part of a single pole in the finished motor as will be understood. Turns of several coils may be laid on the several divider plates, respectively, except for the outermost divider plate 63 which functions merely to confine in a desired manner the coil of greatest span during the coil insertion process. These divider plates, in conjunction with the pusher plates which separate them, function as a coil inserting device.

In a preferred sequence of operations, a core is placed in holder 45; winding turns are developed; cylinder 49 advances the member 51 along the bore of the core; carriage 29 moves toward the free extremity of the winding turn insertion tooling until the member 51 engages the insertion tooling and approximately at which time tension is relieved from the winding turns by collapsing the coil forms; and thereafter the insertion tools insert the winding turns in the stator core as the tools advance along the stator bore, trailing behind the member 51 that is moved back through the stator bore by the insertion tools. The member 51 thereafter is driven to its home position by retraction of cylinder 49.

Of course, the sequence just described may be varied. For example, the sequence of initial actuation of cylinders 47 and 49 relative to one another may be reversed at the beginning of an "insertion cycle". Even in this case however, member 51 would guide the insertion tooling at least until the free extremity of such tooling had entered the bore of the stator core.

From the foregoing description of the improved winding and inserting apparatus and method, it will be apparent that the invention may be embodied in forms other than the forms specifically illustrated and described herein. For example, guide means may be utilized in conjunction with or during the practice of, the apparatus and methods described in Arnold et al patent 3,579,818.

Accordingly, while the present invention has been described in detail and summarized with respect to a specific embodiment, numerous modifications will suggest themselves to those of ordinary skill in the art and may be made without departing from the invention. It is therefore intended in the appended claims to cover all such changes and modifications that fall within the true spirit and scope of the invention.

What we claim as new and desire to secure by Letters Patent of the United States is:

1. A method of winding and inserting at least one coil group into a stator core, comprising:
   winding electrically conductive wire about a coil form to thereby create a coil group;
   collapsing the coil form to relieve the tension on individual turns and thereby allow movement of the coil group;
   passing a guide member through the stator core so as to align the core and guide member;
   moving a portion of the coil form with the coil group suspended therefrom toward the guide member until the portion of the coil form and guide member mesh to thereby properly align the portion with the guide member;
   continuing to move the portion of the coil form so as to force the guide member back through the stator bore, with the guide member maintaining proper alignment of the portion of the coil form and the stator core until the portion of the coil form enters the bore of the stator and at least until means associated with the portion of the coil form engage the stator core so as to maintain proper alignment of the portion of the coil form and the stator core.

2. A method of winding and inserting winding turns into a stator core, comprising:
   winding electrically conductive wire about a coil form to thereby establish the winding turns;
   passing a guide member through the stator core so as to align the core and the guide member;
   collapsing the coil form to relieve the tension on individual turns and thereby to allow movement of the turns relative to the coil form;
   moving a portion of the coil form with the coil turns supported thereon toward the guide member until the portion of the coil form and guide member mesh to thereby properly align the portion with the guide member;
   continuing to move the portion of the coil form and substantially simultaneously moving the guide member back through the stator bore, with the guide member maintaining a predetermined alignment of the portion of the coil form and the stator core at least until the portion of the coil form enters the bore of the stator and at least until means associated with the portion of the coil form engage the stator core to ensure continued alignment of the portion of the coil form and the stator core.

3. A coil winding and inserting machine comprising: a machine frame, a rotatable flyer for generating winding turns and supported for movement relative to the frame; first means for rotating the flyer about a predetermined axis of rotation; a stator core holder for supporting a stator core having a bore; a winding turn receiver for holding winding turns after such winding turns are generated by the flyer, and having a portion movable along the bore of a core supported by the stator core holder; a guide member movable along the bore of a stator core supported by the stator holder; a carriage movable relative to the frame and supporting the stator holder and the guide member; second means for moving the carriage generally toward the winding turn receiver; and third means for moving the guide member, relative to the carriage, toward the winding turn receiver, and along the bore of a stator core supported by the stator holder, whereby interengagement of the guide member and winding turn receiver may be established prior to movement of the winding turn receiver along the bore of a core supported by the stator core holder.

4. The machine of claim 3 wherein the winding turn receiver and guide means are provided with registering means for ensuring a predetermined relative alignment of the winding turn receiver and guide means.

5. The machine of claim 3 wherein the machine frame includes a bed having a general axis of elongation; the flyer is supported for longitudinal movement along the general axis of elongation; and means are provided for causing longitudinal movement of the flyer.

6. A method of winding and inserting at least one coil group into a stator core, comprising:
   winding electrically conductive wire about a coil form to thereby create a coil group;

collapsing the coil form to relieve the tension on individual turns and thereby to allow movement of the coil group;

aligning a core with the coil form by reason of mutual alignment of the coil form and core with a guide member;

moving a portion of the coil form with the coil group suspended therefrom so as to force the guide member through the stator bore, with the guide member maintaining proper alignment of the portion of the coil form at least until means associated with the portion of the coil form engage the stator core so as to maintain proper alignment of the portion of the coil form and the stator core.

7. A method of winding and inserting winding turns into a stator core comprising: winding electrically conductive wire about a coil form to thereby establish the winding turns; collapsing the coil form to relieve the tension on individual turns and thereby allow movement of the turns relative to the coil form; mutually aligning a guide member, stator core, and coil form; moving at least a first portion of the coil form and substantially simultaneously moving the guide member along the stator bore, with the guide member maintaining a predetermined alignment of the first portion of the coil form and the stator core before the coil form enters the bore of the stator and at least until the portion of the coil form enters the bore of the stator and at least until means associated with the first portion of the coil form engage the stator core to ensure continued alignment of the first portion of the coil form and the stator core.

8. A coil winding and inserting machine comprising: a machine frame, a rotatable flyer for generating winding turns and supported for movement relative to the frame; first means for rotating the flyer about a predetermined axis of rotation; a winding turn receiver for holding winding turns after such winding turns are generated by the flyer; a stator holder for supporting a stator core; a guide member movable along the bore of a stator core supported by the stator holder; a carriage movable relative to the frame and supporting at least the stator holder; second means for moving the carriage generally toward the winding turn receiver; and third means for moving the guide member along the bore and relative to the winding turn receiver, and into interengagement with the winding turn receiver whereby interengagement of the winding turn receiver and guide member may be established before the winding turn receiver is in engaging relation with a core.

* * * * *